(12) United States Patent
Ishimoto

(10) Patent No.: US 10,038,257 B2
(45) Date of Patent: Jul. 31, 2018

(54) MULTI-CORE CABLE AND MULTI-CORE CABLE WITH SUBSTRATE

(71) Applicant: SUMITOMO ELECTRIC INDUSTRIES, LTD., Osaka-shi, Osaka (JP)

(72) Inventor: Takeki Ishimoto, Shenzhen (CN)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/306,536

(22) PCT Filed: May 16, 2014

(86) PCT No.: PCT/CN2014/077658
§ 371 (c)(1),
(2) Date: Oct. 25, 2016

(87) PCT Pub. No.: WO2015/172377
PCT Pub. Date: Nov. 19, 2015

(65) Prior Publication Data
US 2017/0047671 A1   Feb. 16, 2017

(51) Int. Cl.
*H01R 9/05* (2006.01)
*H02G 15/04* (2006.01)
(Continued)

(52) U.S. Cl.
CPC ............... *H01R 12/62* (2013.01); *H01B 7/18* (2013.01); *H01R 9/0512* (2013.01);
(Continued)

(58) Field of Classification Search
CPC ... B23K 3/087; B29C 45/14655; B29C 45/26; B29L 2031/3406; H01B 7/18;
(Continued)

(56) References Cited

U.S. PATENT DOCUMENTS 2,454,193 A * 11/1948 Martin ................... H02G 1/145
249/94
5,337,621 A * 8/1994 Spease ................... F16C 1/262
264/275

(Continued)

FOREIGN PATENT DOCUMENTS

CN      1452184 A    10/2003
CN    102945703 A     2/2013
(Continued)

*Primary Examiner* — Timothy Thompson
*Assistant Examiner* — Guillermo Egoavil
(74) *Attorney, Agent, or Firm* — Drinker Biddle & Reath LLP

(57) ABSTRACT

A plurality of electronic wires are fixed by a mold part in a state arranged in at least two rows. The mold part has a first end face from which the electronic wires of a first row in the plurality of electronic wires protrude and a second end face from which the electronic wires of a second row in the plurality of electronic wires protrude. An angle of the first end face with respect to a direction of a central axis line of a multi-core cable differs from an angle of the second end face with respect to the direction of the central axis line. The electronic wires of the first row in the first end face protrude along a direction away from the electronic wires of the second row protruding from the second end face.

6 Claims, 5 Drawing Sheets

(51) Int. Cl.
*H02G 15/013* (2006.01)
*H01R 12/62* (2011.01)
*H01B 7/18* (2006.01)
*H02G 15/02* (2006.01)
*H01R 12/59* (2011.01)

(52) U.S. Cl.
CPC ......... *H01R 9/0515* (2013.01); *H02G 15/025* (2013.01); *H02G 15/046* (2013.01); *H01R 12/596* (2013.01)

(58) Field of Classification Search
CPC .... H01R 12/62; H01R 12/596; H01R 9/0512; H01R 9/0515; H02G 15/025; H02G 15/046; H05K 3/301; H05K 3/3405
USPC ...................... 174/74 R; 269/37; 324/207.25
See application file for complete search history.

(56) References Cited

U.S. PATENT DOCUMENTS

| | | | |
|---|---|---|---|
| 9,865,378 B2 * | 1/2018 | Gundel | H01B 11/203 |
| 2004/0180583 A1 * | 9/2004 | Maruyama | H01R 4/023 |
| | | | 439/736 |
| 2007/0098328 A1 * | 5/2007 | Dean, Jr. | G02B 6/3839 |
| | | | 385/71 |
| 2009/0305551 A1 | 12/2009 | Kameda | |
| 2011/0195593 A1 * | 8/2011 | McGrath | H01R 12/594 |
| | | | 439/345 |
| 2011/0275228 A1 * | 11/2011 | Niitsu | H01R 12/716 |
| | | | 439/65 |
| 2012/0040556 A1 * | 2/2012 | Tanaka | H01R 9/038 |
| | | | 439/578 |
| 2013/0333943 A1 | 12/2013 | Tanaka et al. | |
| 2014/0027686 A1 * | 1/2014 | Togashi | C08K 5/357 |
| | | | 252/587 |
| 2014/0154928 A1 * | 6/2014 | Nonen | H01R 4/04 |
| | | | 439/660 |
| 2014/0191457 A1 * | 7/2014 | Sharma | H05K 3/301 |
| | | | 269/37 |
| 2015/0061657 A1 * | 3/2015 | Takiguchi | G01D 5/145 |
| | | | 324/207.25 |

FOREIGN PATENT DOCUMENTS

| | | | | |
|---|---|---|---|---|
| JP | 2006-019215 A | | 1/2006 | |
| JP | 2013-251223 A | | 12/2013 | |
| JP | 2015064331 A | * | 4/2015 | |
| WO | WO-99/19213 A2 | | 4/1999 | |
| WO | WO 9919213 A3 | * | 7/1999 | ........... H01R 9/0515 |
| WO | WO-A1-2008-085321 | | 7/2008 | |

* cited by examiner

MULTI-CORE CABLE AND MULTI-CORE CABLE WITH SUBSTRATE

TECHNICAL FIELD

The present invention relates to a multi-core cable including plural electronic wires, and a multi-core cable with a substrate.

BACKGROUND ART

A related-art multi-core cable accommodates plural electronic wires. In the distal end of the multi-core cable, a cable sheath is removed to expose each of the electronic wires and the exposed portion of each of the electronic wires is be soldered and connected to a substrate in an aligned state (see Japanese Patent Publication No. JP-A-2013-251223).

CITATION LIST PATENT LITERATURE

[PTL] Japanese Patent Publication No. JP-A-2013-251223

SUMMARY OF INVENTION

Technical Problem

It is requested to miniaturize a shape of the distal end of the multi-core cable. However, in the multi-core cable, an increase in the number of electronic wires increases a width dimension in a direction in which each of the electronic wires is arranged in parallel. In the related-art multi-core cable, it was difficult to miniaturize the distal end of the multi-core cable.

Solution to Problem

The present invention provides a multi-core cable capable of miniaturizing a distal end connected to a substrate, and a multi-core cable with a substrate.

A multi-core cable according to the invention comprises:
a plurality of electronic wires;
a cable sheath accommodating the plurality of electronic wires; and
a mold part made by a resin, fixing a part of a portion protruding from a longitudinal end of the cable sheath in the plurality of electronic wires,
wherein the plurality of electronic wires are fixed by the mold part in a state arranged in at least two rows,
wherein the mold part has a first end face from which the electronic wires of a first row in the plurality of electronic wires protrude and a second end face from which the electronic wires of a second row in the plurality of electronic wires protrude,
wherein an angle of the first end face with respect to a direction of a central axis line of the multi-core cable differs from an angle of the second end face with respect to the direction of the central axis line, and
wherein the electronic wires of the first row in the first end face protrude along a direction away from the electronic wires of the second row protruding from the second end face.

A multi-core cable with a substrate, according to the invention, comprises:
a multi-core cable as mentioned above; and
a substrate to which ends of a plurality of electronic wires of the multi-core are connected,
wherein each of the electronic wires protruding from the first end face is connected to a first surface of the substrate, and each of the electronic wires protruding from the second end face is connected to a second surface opposite to the first surface of the substrate.

Advantageous Effects of Invention

According to the present invention, it is possible to provide a multi-core cable capable of miniaturizing a distal end connected to a substrate, and a multi-core cable with a substrate.

DESCRIPTION OF EMBODIMENTS

<Summary of Embodiment of the Invention>

Figure 1:
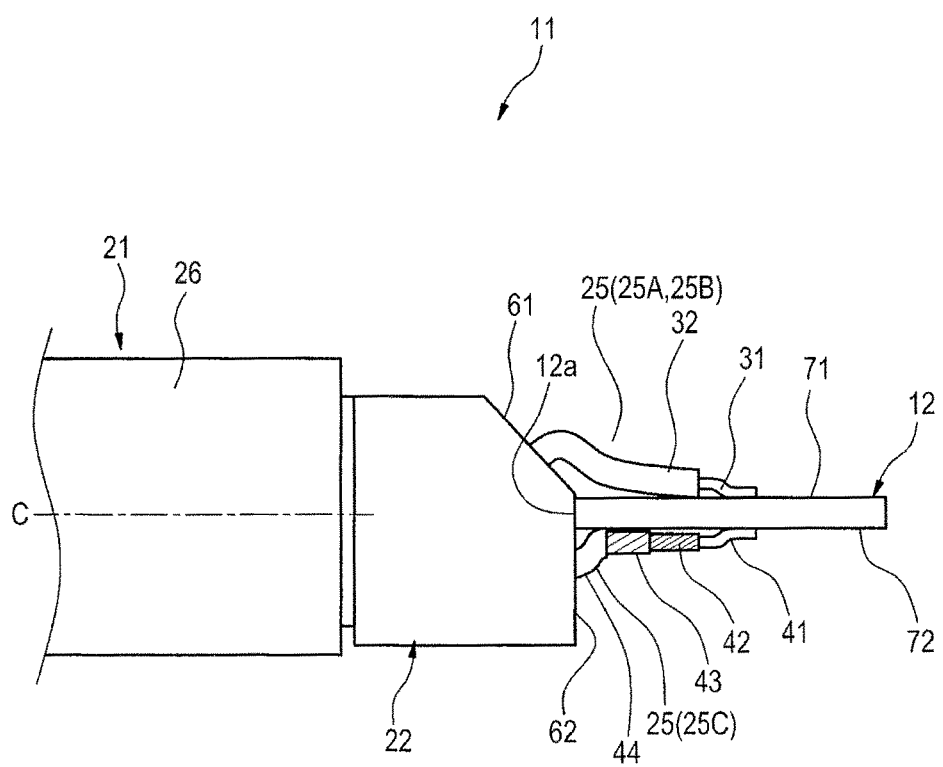
FIG. 1 is a side view in the end of a multi-core cable according to the present embodiment.

Firstly, the summary of embodiment of the invention will be explained.

(1) A multi-core cable according to an embodiment of the invention is a multi-core cable comprising:
a plurality of electronic wires;
a cable sheath accommodating the plurality of electronic wires; and
a mold part made by a resin, fixing a part of a portion protruding from a longitudinal end of the cable sheath in the plurality of electronic wires,
wherein the plurality of electronic wires are fixed by the mold part in a state arranged in at least two rows,
wherein the mold part has a first end face from which the electronic wires of a first row in the plurality of electronic wires protrude and a second end face from which the electronic wires of a second row in the plurality of electronic wires protrude,
wherein an angle of the first end face with respect to a direction of a central axis line of the multi-core cable differs from an angle of the second end face with respect to the direction of the central axis line, and
wherein the electronic wires of the first row in the first end face protrude along a direction away from the electronic wires of the second row protruding from the second end face.

According to the structure of (1), the dimensions of the mold part in the width direction and the length direction can be decreased, and the distal end portion of the multi-core cable can be miniaturized.

(2) The first end face may be a surface inclined to the direction of the central axis line, and each of the electronic wires protruding from the first end face may be an insulated electronic wire.

The second end face may be a surface intersecting perpendicularly to the direction of the central axis line, and each of the electronic wires protruding from the second end face may be a coaxial electronic wire.

According to the structure of (2), only the insulated electronic wire, the electrical characteristics of which is less affected by bending, can be bent inside the mold part one time, and the coaxial electronic wire can protrude from the mold part without being bent inside the mold part. Consequently, communication quality of the multi-core cable can be maintained.

(3) A multi-core cable with a substrate according to an embodiment of the invention is a multi-core cable with a substrate, comprising:

a multi-core cable as mentioned in (1) or (2); and a substrate to which ends of a plurality of electronic wires of the multi-core are connected, wherein each of the electronic wires protruding from the first end face is connected to a first surface of the substrate, and each of the electronic wires protruding from the second end face is connected to a second surface opposite to the first surface of the substrate.

According to the structure of (3), a width dimension of the substrate can be decreased. Further, strength of connection between the substrate and the multi-core cable can be increased since the plural electronic wires are connected to the both surfaces of the substrate.

(4) An end of the substrate may abut on the second end face intersecting perpendicularly to the direction of the central axis line.

According to the structure of (4), the end of the substrate can be positioned by using the second end face which is the surface intersecting perpendicularly to the direction of the axis line of the cable. Accordingly, the substrate can be positioned with high accuracy.

DETAILS OF EMBODIMENT OF THE INVENTION

One example of an embodiment of the invention will hereinafter be described with reference to the drawings.

As shown in FIG. 1, a multi-core cable with a substrate of the present embodiment is a multi-core cable 11 with a substrate 12.

The substrate 12 has a first surface 71 and a second surface 72 on which plural terminal parts including conductor patterns are formed. As this substrate 12, for example, flexible printed circuits (FPC), a hard printed wiring board (PWB), etc. are used.

Figure 2:
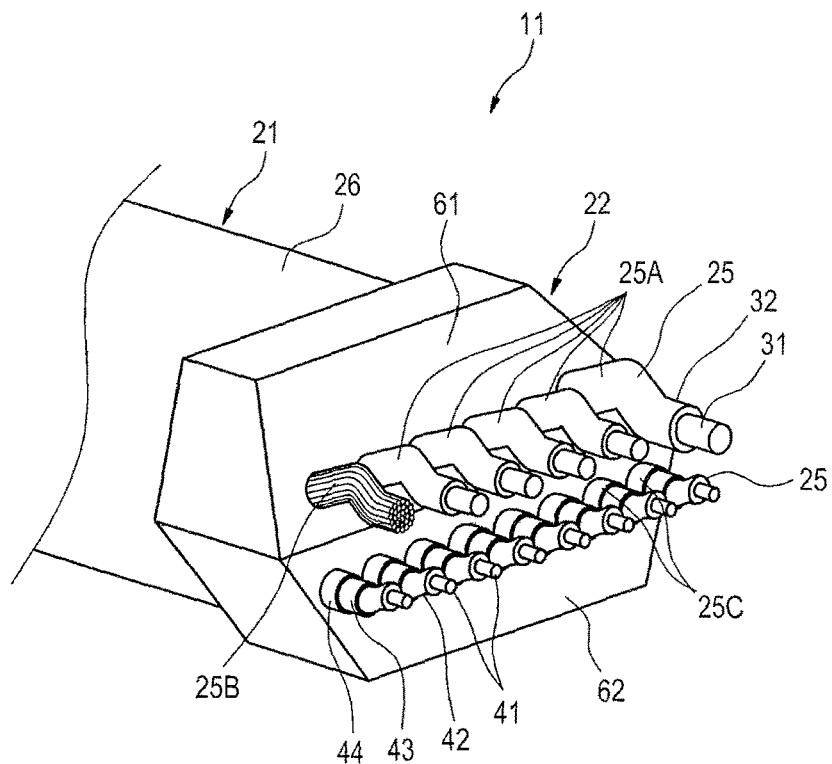
FIG. 2 is a perspective view of a mold part of the multi-core cable.
Figure 3:
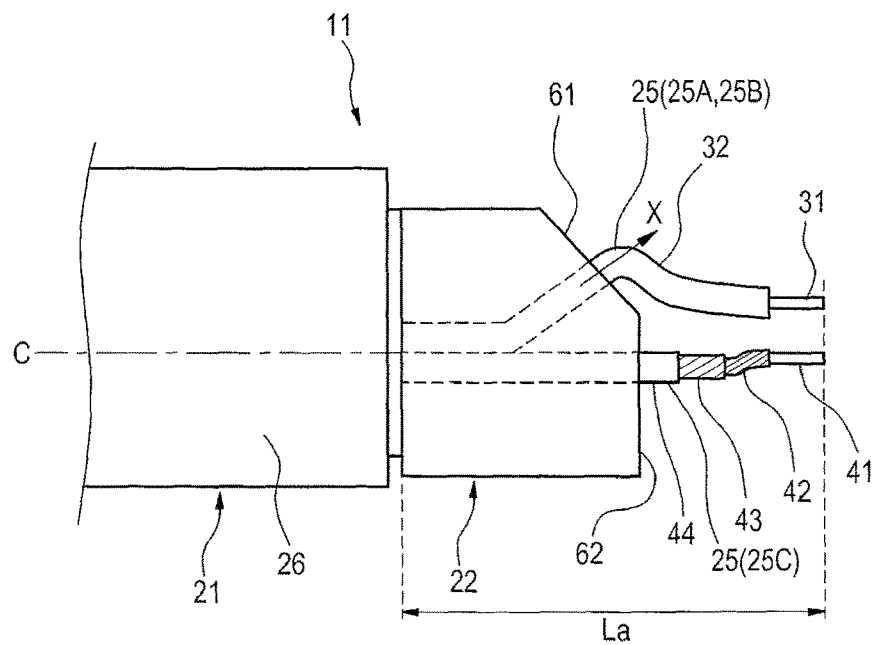
FIG. 3 is a side view of the mold part of the multi-core cable.

As shown in FIGS. 2 and 3, the multi-core cable 11 includes a cable body 21 and a mold part 22. In addition, FIGS. 2 and 3 omit illustration of the substrate 12.

The cable body 21 has plural (14 in the present example) electronic wires 25, and a cable sheath 26 accommodating these electronic wires 25. The cable body 21 is formed in a circular cross section by covering the periphery of the bundled electronic wires 25 with the cable sheath 26.

As the cable sheath 26, a resin with good flexibility, abrasion resistance and mechanical characteristics is used. For example, fluorine resin, polyvinyl chloride (PVC), urethane, polyolefin, silicone, or polyvinylidene chloride is used.

The end of each of the electronic wires 25 is exposed from the end of the cable sheath 26 to the outside. In the electronic wire 25, the vicinity of the end exposed from the end of the cable sheath 26 is embedded and fixed in the mold part 22, and the distal end protrudes and is exposed from the mold part 22. The electronic wire 25 is, for example, a small-diameter wire with an outside diameter of less than 0.6 mm and larger than 0.1 mm, and the present example has five insulated electronic wires 25A, one drain wire 25B and eight coaxial electronic wires 25C.

The insulated electronic wires 25A has, for example, a conductor 31 formed by stranding plural plated copper wires or plated copper alloy wires. The plating includes a tin plating or silver plating. An outer periphery of the conductor 31 is covered with a jacket 32 made of a resin such as polyester, polyethylene or fluorine resin. In the distal end protruding from the mold part 22, a part of the jacket 32 of the insulated electronic wire 25A is removed to expose the conductor 31.

The drain wire 25B is, for example, a conductor formed by stranding plural tin-plated copper wires or copper alloy wires.

The coaxial electronic wire 25C has a central conductor 41 in the center, and the periphery of this central conductor 41 is sequentially provided with an insulator 42, an external conductor 43 and a jacket 44 coaxially. In the distal end protruding from the mold part 22, parts of the insulator 42, the external conductor 43 and the jacket 44 of the coaxial electronic wire 25C are removed to sequentially expose the central conductor 41, the insulator 42 and the external conductor 43.

The five insulated electronic wires 25A and the one drain wire 25B of the electronic wires 25 are arranged in a first row, and the eight coaxial electronic wires 25C of the electronic wires 25 are arranged in a second row. In the present example, the 14 electronic wires 25 are arranged in parallel in two rows including the row of the insulated electronic wires 25A and the drain wire 25B and the row of the coaxial electronic wires 25C.

The mold part 22 is molded of synthetic resin. This mold part 22 has a first end face 61 and a second end face 62 on the distal end side. The insulated electronic wires 25A and the drain wire 25B arranged in the first row in the electronic wires 25 protrude from the first end face 61. The coaxial electronic wires 25C arranged in the second row in the electronic wires 25 protrude from the second end face 62.

The first end face 61 is a surface inclined to a direction of a central axis line C of the multi-core cable 11, and the second end face 62 is a surface intersecting perpendicularly to the direction of the central axis line C. Accordingly, an angle of the first end face 61 with respect to the direction of the central axis line C differs from an angle of the second end face 62 with respect to the direction of the central axis line C. In the present example, the first end face 61 is inclined at about 45° to the second end face 62.

The insulated electronic wires 25A and the drain wire 25B protrude perpendicularly to the first end face 61, and the coaxial electronic wires 25C protrude perpendicularly to the second end face 62. The insulated electronic wires 25A and the drain wire 25B which are the electronic wires 25 of the first row protruding from to the first end face 61 protrude along a direction (arrow X in FIG. 3) away from the coaxial electronic wires 25C which are the electronic wires 25 of the second row protruding from to the second end face 62.

The conductors 31 of the insulated electronic wires 25A and the drain wire 25B protruding from the first end face 61 of the mold part 22 are soldered and connected to the terminal parts formed on the first surface 71 of the substrate 12 (see FIG. 1). Also, the central conductors 41 of the coaxial electronic wires 25C protruding from the second end face 62 of the mold part 22 are soldered and connected to the terminal parts formed on the second surface 72 of the substrate 12. Also, the external conductors 43 of the coaxial electronic wires 25C are soldered and connected to a ground pattern formed on the second surface 72 of the substrate 12.

Also, an end 12a of the substrate 12 on the side of the multi-core cable 11 is abutted on the second end face 62 of the mold part 22 (see FIG. 1). Accordingly, the substrate 12 is positioned with respect to the multi-core cable 11, and the conductor or the external conductor of each of the electronic wires 25 is accurately arranged with respect to each of the terminal parts of the substrate 12 at the connection.

Figure 4:
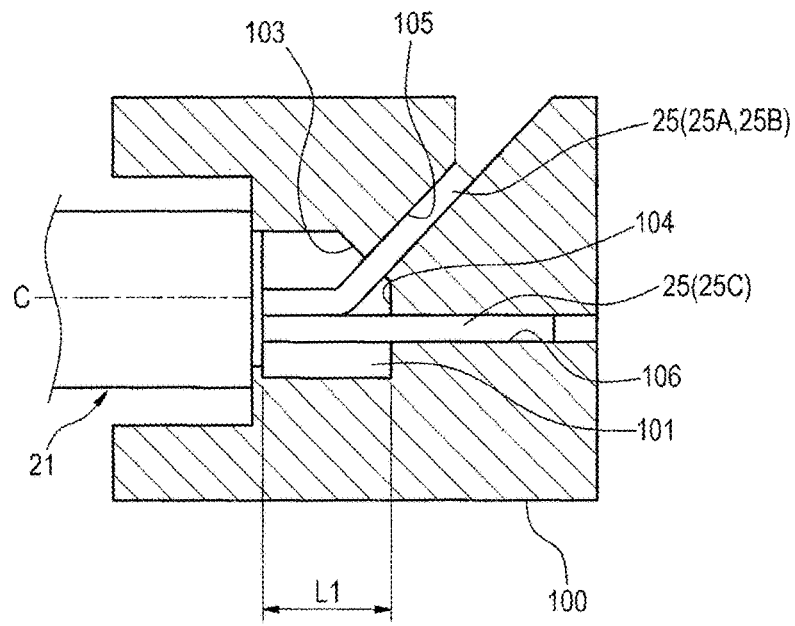
FIG. 4 is a sectional view of a metal mold for molding the mold part to which the end of a cable body is attached.

As shown in FIG. 4, the mold part 22 of the multi-core cable 11 is molded using a metal mold 100. The metal mold 100 has molding space 101 for molding the mold part 22, and this molding space 101 is filled with a molten resin and the molten resin is cooled and cured to thereby mold the mold part 22. This metal mold 100 has a first end face molding surface 103 for molding the first end face 61 of the mold part 22, and a second end face molding surface 104 for molding the second end face 62. Also, this metal mold 100 has plural first cable insertion holes 105 opened in the first end face molding surface 103, and plural second cable insertion holes 106 opened in the second end face molding surface 104. The first cable insertion hole 105 is inclined obliquely to the second cable insertion hole 106. The second cable insertion hole 106 is extended parallel to the central axis line C of the cable body 21 of the multi-core cable 11.

In the case of molding the mold part 22, the insulated electronic wires 25A and the drain wire 25B of the electronic wires 25 exposed from the end of the cable sheath 26 are inserted into the first cable insertion holes 105 and the coaxial electronic wires 25C of the electronic wires 25 are inserted into the second cable insertion holes 106. At this time, the insulated electronic wires 25A and the drain wire 25B are bent in one place and are guided to the first cable insertion holes 105, and the coaxial electronic wires 25C are guided to the second cable insertion holes 106 without being bent. Consequently, in the present embodiment, the number of bends of the electronic wires 25 in any one of rows inside the mold part 22 can be set at one time.

Accordingly, a length dimension L1 of the mold part 22 along the direction of the central axis line C of the multi-core cable 11 can be decreased. Concretely, the length dimension L1 of the mold part 22 along the direction of the central axis line C of the multi-core cable 11 can be decreased to 4 mm or less (for example, about 3.5 mm).

Figure 5:
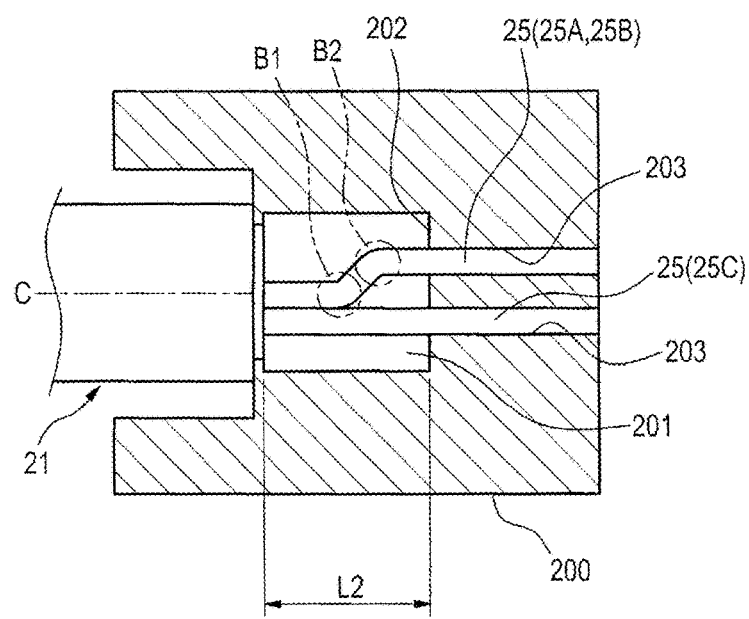
FIG. 5 is a sectional view of a metal mold, according to a reference example, for molding a mold part to which the end of a cable body is attached.

FIG. 5 shows a metal mold 200 of a reference example having molding space 201. The metal mold 200 has an end face molding surface 202 for molding an end face of a mold part. In the metal mold 200, plural cable insertion holes 203 opened in the end face molding surface 202 are formed parallel in two upper and lower lines parallel to the central axis line C of the cable body 21 of the multi-core cable 11. In this metal mold 200, the insulated electronic wires 25A and the drain wire 25B are inserted into the cable insertion holes 203 of the upper line and the coaxial electronic wires 25C are inserted into the cable insertion holes 203 of the lower line. The size of each of electronic wires is the same as the example of FIG. 4.

At this time, the insulated electronic wires 25A and the drain wire 25B are bent in two places (portions shown by B1 and B2 in FIG. 5) and are guided to the cable insertion holes 203 of the upper line. Accordingly, a length dimension L2 of the mold part 22 along the direction of the central axis line C of the multi-core cable 11 increases to about 4.5 mm.

Next, distal end processing of the insulated electronic wires 25A and the coaxial electronic wires 25C will be described.

Figure 6A:
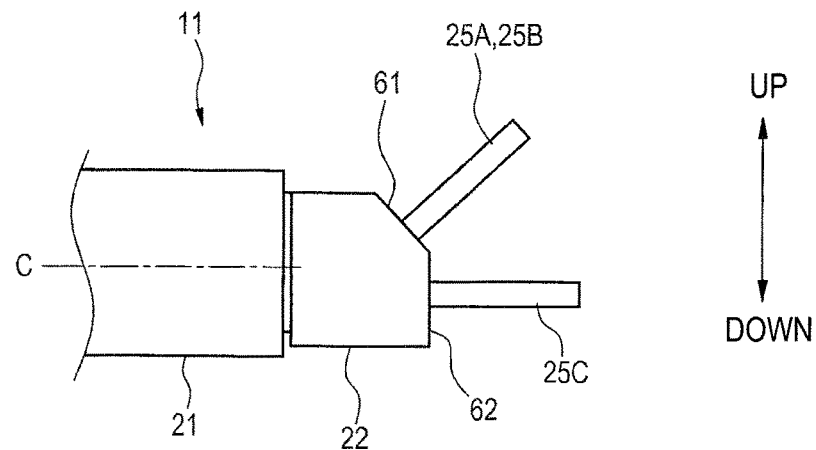
FIGS. 6A, 6B and 6C are side views of the mold parts, describing distal end processing of electronic wires of the multi-core cable, respectively.

As shown in FIG. 6A, in the case of molding the mold part 22 using the metal mold 100, electronic wires 25A, 25B protrude from the first end face 61 and the electronic wires 25C protrude and are extended from the second end face 62.

Figure 6B:
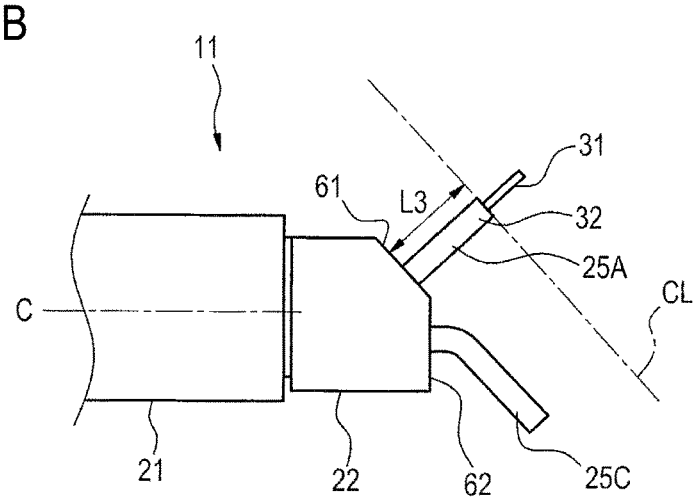

In this state, as shown in FIG. 6B, a laser is applied to the insulated electronic wire 25A protruding from the first end face 61 in a cut line CL parallel to the first end face 61 and the jacket 32 is cut and the distal end side of the jacket 32 is removed. By applying the laser in the cut line CL based on the first end face 61 at this time, the jacket 32 of the insulated electronic wire 25A can be cut with high-accuracy dimensions. Also, in the case of applying the laser to the insulated electronic wire 25A, the coaxial electronic wire 25C is bent downwardly at about 45° and is arranged in a position deviating from the cut line CL by a predetermined distance so as not to apply the laser to the coaxial electronic wire 25C.

Figure 6C:
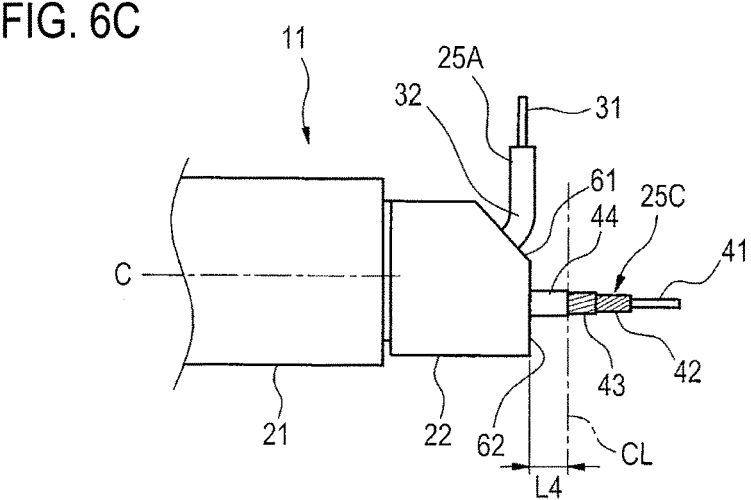

Next, as shown in FIG. 6C, a laser is applied to the coaxial electronic wire 25C protruding from the second end face 62 in a cut line CL parallel to the second end face 62, and the jacket 44, the external conductor 43 and the insulator 42 are sequentially cut and the respective distal end sides are removed. By applying the laser in the cut line CL based on the second end face 62 at this time, the jacket 44, the external conductor 43 and the insulator 42 of the coaxial electronic wire 25C can be cut with high-accuracy dimensions. Also, in the case of applying the laser to the coaxial electronic wire 25C, the insulated electronic wire 25A is bent upwardly at about 45° and is arranged in a position deviating from the cut line CL by a predetermined distance so as not to apply the laser to the insulated electronic wire 25A.

Figure 7A:
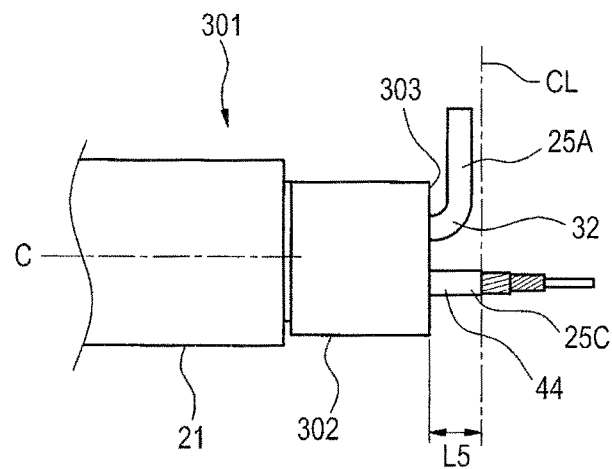
FIGS. 7A and 7B are side views of the mold parts, describing distal end processing of electronic wires of a multi-core cable according to a reference example, respectively.

FIG. 7A shows a multi-core cable 301 according to a reference example. This multi-core cable 301 includes a mold part 302 molded by the metal mold 200. The mold part 302 has an end face 303 intersecting perpendicularly to the direction of the central axis line C, and electronic wires 25 arranged in two rows protrude from the end face 303.

In the case of performing distal end processing of a coaxial electronic wire 25C in this multi-core cable 301, an insulated electronic wire 25A protruding from the same end face 303 must be bent at about 90° and be arranged in a position deviating from a cut line CL to avoid application of a laser to the insulated electronic wire 25A. Similarly, in the case of performing distal end processing of the insulated electronic wire 25A, the coaxial electronic wire 25C protruding from the same end face 303 must be bent at about 90° and be arranged in a position deviating from the cut line CL by a predetermined distance to avoid application of a laser to the coaxial electronic wire 25C.

As shown in FIG. 6C and FIG. 7A, in the distal end processing, in order to avoid application of the laser to the bent electronic wires 25 to which the laser is not applied, the laser application position must be set away from the end of the mold part. Therefore, a portion with a predetermined length in the jacket of each of the electronic wires 25 protruding from the end face of the molded part is not removed and remained. The minimum length of the remained portion is represented by L4 in FIG. 6C and by L5 in FIG. 7A. A length L4 is smaller than a length L5 (L4<L5) due to the differences of the positions at which the electronic wires 25 protrude from the end face of the mold part and angles at which the electronic wires 25 are bent. In other words, the present example can make the length of each of the electronic wires protruding from the end face of the mold part small as compared with the reference example. Further, in a case where the coaxial electronic wire 25C has a very small diameter, in the reference example, when it is bent at 90°, the conductor or insulator is deformed as compared with the example of FIG. 6B in which it is bent at 45°, and the electrical characteristics may be influenced by this deformation of the conductor or insulator.

Figure 7B:
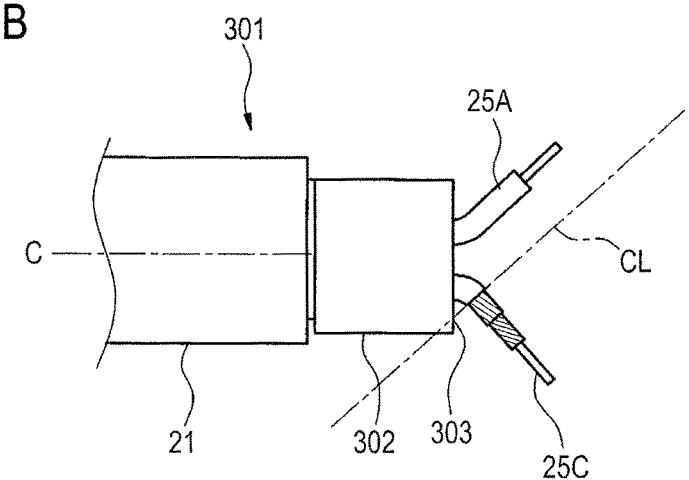

Also, as shown in FIG. 7B, in the multi-core cable 301 including the mold part 302 having one end face 303, even if the insulated electronic wire 25A and the coaxial electronic wire 25C are bent at about 45° in mutually opposite directions and a laser is orthogonally applied to the insulated electronic wire 25A or the coaxial electronic wire 25C, a cut line CL in which the laser is applied is across the mold part 302, and the laser cannot be applied.

According to the embodiment as described above, the plural (14 in the present example) electronic wires 25 (25A, 25B, 25C) are fixed in a state arranged in plural rows (two rows in the present example) (see, for example, FIG. 2). As a result, as compared with a related-art multi-core cable in which each of the electronic wires 25 is fixed in the distal end of the cable in a state arranged in one row, a width dimension of the mold part 22 for maintaining an arrangement state of each of the electronic wires 25 can be decreased by decreasing a width dimension in a direction in which each of the electronic wires 25 is arranged in parallel.

Also, according to the embodiment, the number of bends of the electronic wire 25 inside the mold part 22 can be decreased as compared with the multi-core cable 301 (see FIG. 5 or 7) of the reference example in which the electronic wires 25 of two rows protrude in parallel. As a result, the length dimension L1 of the mold part 22 along the direction of the central axis line C of the multi-core cable 11 can be decreased.

According to the embodiment, the dimensions of the mold part 22 in the width direction and the length direction can be decreased.

Also, in the embodiment, as compared with the multi-core cable 301 of the reference example in which the electronic wires of two rows protrude in parallel, a length L3 of the jacket 32 or the length L4 of the jacket 44 in which each of the electronic wires 25 protrudes from the mold part 22 can also be decreased (see FIG. 6). Concretely, the length dimension L4 of the jacket 44 of the coaxial electronic wire 25C protruding from the mold part 22 can be set at about 0.5 mm. Accordingly, a place of connection between the electronic wire 25 and the terminal part of the substrate 12 can be brought near to the side of the mold part 22 in the substrate 12, and the substrate 12 can also be miniaturized. According to the embodiment, the whole distal end portion of the multi-core cable 11 can be miniaturized. Concretely, the dimension La (See FIG. 3) of the distal end portion including the mold part 22 ranging to the distal end of the electronic wire 25 can be decreased to about 6.4 mm.

Also, the electronic wire 25 protruding from the first end face 61 which is the inclined surface is bent inside the mold part 22. The electronic wire 25 protruding from the first end face 61 is the insulated electronic wire 25A, and the electronic wire 25 protruding from the second end face 62 intersecting perpendicularly to the direction of the central axis line C is the coaxial electronic wire 25C. Accordingly, the insulated electronic wire 25A, which is less affected by bending, can be bent inside the mold part 22 one time, and the coaxial electronic wire 25C can protrude from the mold part 22 without being bent inside the mold part 22. Consequently, communication quality of the coaxial electronic wire 25C can be maintained.

Also, according to the multi-core cable with the substrate in which the multi-core cable 11 is provided with the substrate 12, strength of connection between the substrate 12 and the multi-core cable 11 can be increased since the plural electronic wires 25 are connected to the first surface 71 and the second surface 72 of the substrate 12 and are fixed to both surfaces of the substrate 12. Also, a width dimension of the substrate 12 can be decreased.

Moreover, by abutting the end 12a of the substrate 12 on the second end face 62 which is the surface intersecting perpendicularly to the direction of the central axis line C of the cable body 21, the substrate 12 can be positioned using the second end face 62. Accordingly, the substrate 12 can be positioned with respect to the mold part 22 with high accuracy, and the electronic wire 25 can be positioned with respect to the terminal part of the substrate 12 with high accuracy.

The invention has been described above in detail with reference to the specific embodiment, but it is apparent to those skilled in the art that various changes or modifications can be made without departing from the spirit and scope of the invention. Also, shapes, positions, the number of components, etc. described above are not limited to the embodiment described above, and the embodiment can be changed to the shapes, the positions, the number, etc. suitable to carry out the invention.

For example, the embodiment described above illustrates the case of forming the two end faces on the distal end side of the mold part 22, but the mold part 22 may have three or more end faces and the electronic wires 25 may be arranged in one row in each of these end faces.

Figure 8:
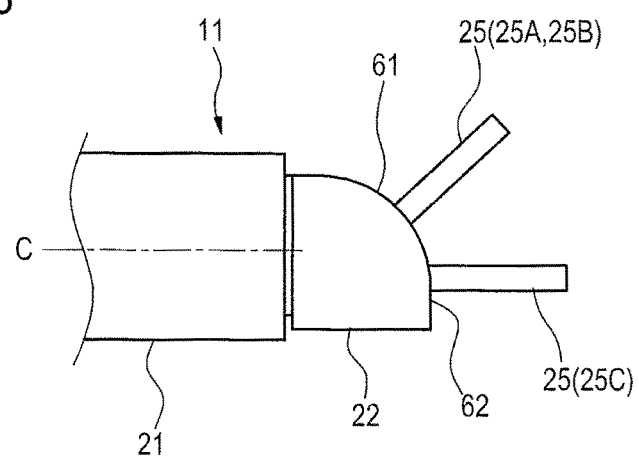
FIG. 8 is a side view of a mold part of a multi-core cable according to a modified example.

Also, as shown in FIG. 8, the mold part 22 may have a curved surface including a part of a circular arc shape in side view. In this case, a part, from which the electronic wires (electronic wires 25A and 25B in FIG. 8) in one row protrude, of the curved surface of the mold part 22 corresponds to the first end face 61, and the other part, from which the electronic wires (electronic wires 25C in FIG. 8) in the other row protrude, of the curved surface of the mold part 22 corresponds to the second end face 62.

REFERENCE SIGNS LIST

11: multi-core cable
12: substrate
22: mold part
25: electronic wire
25A: insulated electronic wire
25B: drain wire
25C: coaxial electronic wire
26: cable sheath
61: first end face
62: second end face
71: first surface
72: second surface
C: central axis line

The invention claimed is:
1. A multi-core cable comprising:
a plurality of electronic wires;
a cable sheath accommodating the plurality of electronic wires; and
a mold part made by a resin, fixing a part of a portion protruding from a longitudinal end of the cable sheath in the plurality of electronic wires, wherein the plurality of electronic wires are directly fixed by the mold part in a state arranged in at least two rows, wherein the mold part has a first end face from which the electronic wires of a first row in the plurality of electronic wires protrude and a second end face from which the electronic wires of a second row in the plurality of electronic wires protrude, wherein an angle of the first end face with respect to a direction of a central axis line of the multi-core cable differs from an angle of the second end face with respect to the direction of the central axis line, and wherein the electronic wires of the first row in the first end face protrude along a direction away from the electronic wires of the second row protruding from the second end face, and the electronic wires of at least one of the first or the second row are bent to a direction approaching to the other row at a region nearer to a tip of the cable.

2. The multi-core cable as claimed in claim 1, wherein the first end face is a surface inclined to the direction of the central axis line, and each of the electronic wires protruding from the first end face is an insulated electronic wire, and wherein the second end face is a surface intersecting perpendicularly to the direction of the central axis line, and each of the electronic wires protruding from the second end face is a coaxial electronic wire.

3. A multi-core cable with a substrate, comprising:
a multi-core cable as claimed in claim 1; and
a substrate to which ends of a plurality of electronic wires of the multi-core are connected, wherein each of the electronic wires protruding from the first end face is connected to a first surface of the substrate, and each of the electronic wires protruding from the second end face is connected to a second surface opposite to the first surface of the substrate.

4. The multi-core cable with a substrate as claimed in claim 3, wherein an end of the substrate abuts on the second end face intersecting perpendicularly to the direction of the central axis line.

5. A multi-core cable with a substrate, comprising:
a multi-core cable as claimed in claim 2; and
a substrate to which ends of a plurality of electronic wires of the multi-core are connected, wherein each of the electronic wires protruding from the first end face is connected to a first surface of the substrate, and each of the electronic wires protruding from the second end face is connected to a second surface opposite to the first surface of the substrate.

6. The multi-core cable with a substrate as claimed in claim 5, wherein an end of the substrate abuts on the second end face intersecting perpendicularly to the direction of the central axis line.

* * * * *